UNITED STATES PATENT OFFICE.

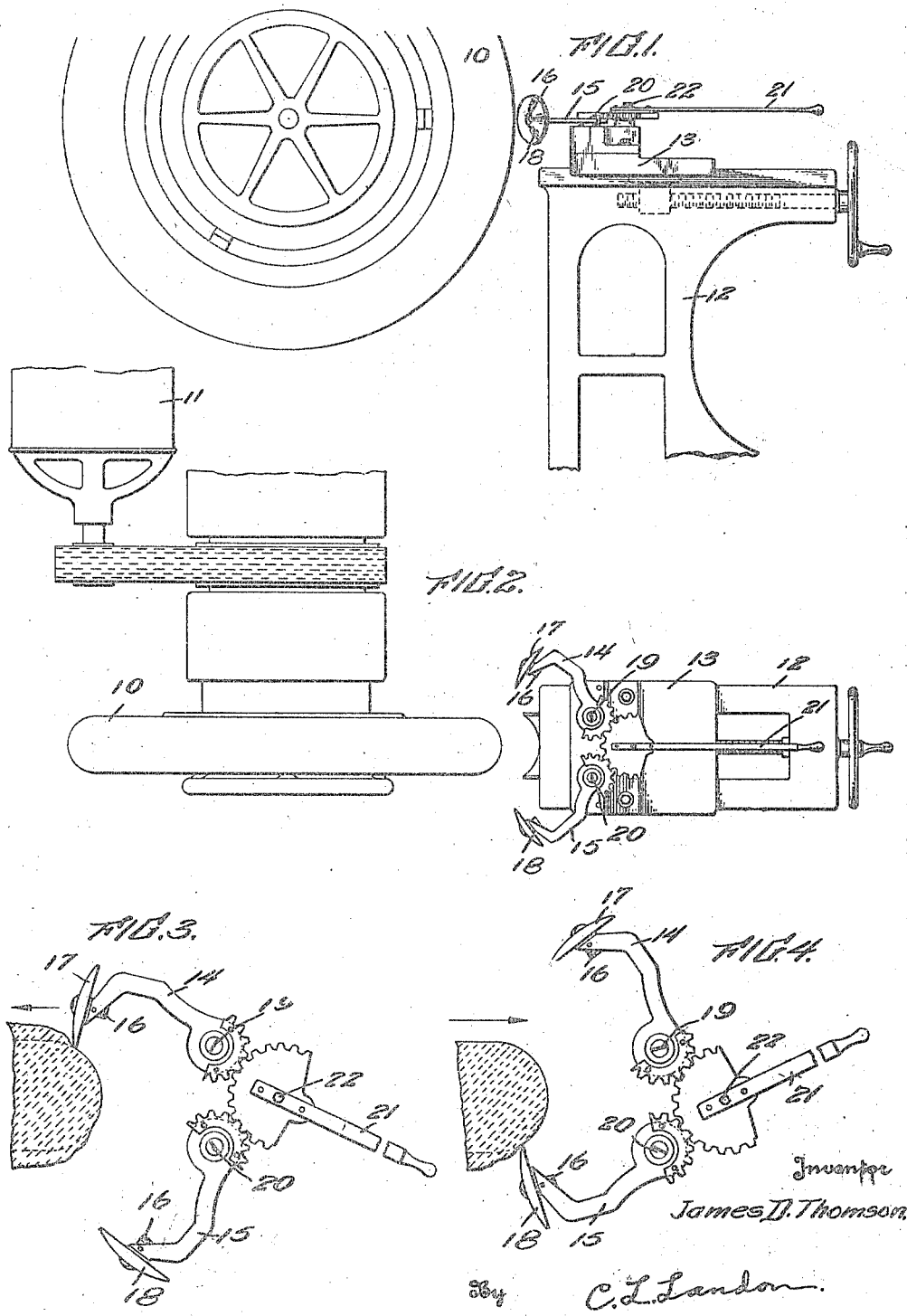

JAMES D. THOMSON, OF AKRON, OHIO, ASSIGNOR TO THE GOODYEAR TIRE & RUBBER COMPANY, OF AKRON, OHIO, A CORPORATION OF OHIO.

TIRE-MACHINE.

1,275,794.     Specification of Letters Patent.     Patented Aug. 13, 1918.

Application filed January 12, 1918. Serial No. 211,521.

*To all whom it may concern:*

Be it known that I, JAMES D. THOMSON, a subject of the King of Great Britain, residing at Akron, in the county of Summit and State of Ohio, have invented new and useful Improvements in Tire-Machines, of which the following is a specification.

My present invention relates to an improvement in tire making machines and has particular reference to an improved mechanism for controlling the position of the stitchers or fabric forming disks employed on such machines.

In the best known types of tire making machines now in commercial use, the fabric tire carcasses are built up on an iron core through the winding of the strips or sheets of fabric on the core and the subsequent stretching or arranging of the edge portions of the fabric to bring the threads thereof in proper position on the core.

This forming of the fabric about the core is ordinarily referred to in the art as stitching and is accomplished by a pair of revoluble stitchers or forming disks, pivotally mounted on a carriage slidably mounted for advancement toward or retraction from the core.

The stitchers are spaced a sufficient distance to allow the crown of the core to be received between them when the stitching operation is started and are held against the surface of the core either manually by the operator or through the use of a spring or its equivalent. The core is rapidly rotated while the stitching operation is going on and as the core rotates the stitchers are gradually moved in on the core toward the axis of the core, whereby a series of circumferential convolutions are scribed by the stitcher against the side of the core with the result that the fabric is gradually formed down on the core.

In the manufacture of cord tires the difference in the type of fabric employed to build up a carcass requires considerable variation in the use and operation of the stitchers.

In a fabric tire the fabric plies employed are woven with weft and warp threads which cross each other at right angles and are interlocked in the usual manner.

However, the fabric employed to build up a cord tire consists only of relatively large cords which run in parallelism to each other and are unconnected to each other except for a temporary union which is obtained by the use of a very light weft thread, designed only to hold the cord elements in proper fabricated relation to each other until after the tire carcass is built up and vulcanized.

As soon as the tire is placed in the mold the light cross weave cords are broken through the expansion which occurs in the curing.

In view of the fact that this cord fabric is cut on the bias before the plies are laid on to the core, it is obvious that the cords will run across the crown and down the side walls of the core at an angle, (which in practice is usually an approximate angle of 45 degrees), to the circumferential center line thereof.

Now, while in the building of an ordinary fabric tire on a core the warp and weft threads are of the same size and closely interwoven to give the fabric a strong unity, and the threads or cords in the fabric, which are at an angle opposing the progression of the stitchers around the core and are thereby held against undue displacement or distortion through action of the stitchers, it happens, in the case of the fabric employed to build up a cord tire, that the cords forming the fabric all run in one direction and therefore one stitcher running on one side of the core will be progressing around the core in the direction following the lines of the cords but the other stitcher on the opposite side will be running in direct opposition to the lay of the cords and will, therefore, tend to buckle and roll them up from the side of the core.

It is, therefore, impracticable in laying down upon the core the fabric for making a cord tire, to simultaneously employ the two stitchers, one on each side of the core.

Being cognizant of the foregoing conditions, I have, therefore, had in mind as a principal object of this invention, the provision of a stitching unit for tire building machines which is so constructed that the two stitchers may be manually operated by a machine operator in such a manner that when one stitcher is brought into engagement with one side of the core, the other stitcher is automatically moved into its inoperative position.

Another object of the invention is to combine a stitcher control of this character with a reversible drive for a core so that the core may be driven in either direction according to which stitcher is employed, to insure that the stitcher in service will progress around the tire in the direction of the lines followed by the cords of the ply of fabric which is being applied.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a front elevation of a tire making machine with my improved device mounted thereon;

Fig. 2 is a top plan view of the same;

Fig. 3 is a diagrammatic view illustrating the action of one of the stitchers; and Fig. 4 is a diagrammatic view illustrating the action of the other stitcher.

In the accompanying drawings the type of tire machine, which is conventionally illustrated, is that more largely used commercially, but I desire it, of course, to be understood that my improved stitcher and the reversible drive for the core is not limited to use in connection with a machine of this type, but may be used in connection with any other tire making machine of a modified type which embodies the essential elements of a driven core and a stitching mechanism.

In Fig. 1, the numeral 10 designates a revoluble core driven through a suitable connection by a motor 11, the driving mechanism being so arranged as to permit reversing the direction of rotation of the core at will, as, for example, by reversal of the electric motor shown.

The stitching unit comprises a base 12 upon which is slidably mounted for reciprocation toward or away from the core, a slide or carriage 13. Upon the forward end of the slide or carriage 13 are pivoted a pair of stitcher supporting arms 14 and 15, to the free and forward end of which are revolubly secured by an axle 16 a pair of stitcher disks 17 and 18 of the usual conformation.

The pivots 19 and 20, which secure the stitcher arms upon the carriage, are preferably disposed at the rear ends of the arms as in Fig. 1. On the rear end of these arms are an integrally formed segmental series of rack teeth which are disposed to engage with a segmental series of rack teeth on the end of control lever 21. This lever is pivoted as at 22 on the top of carriage and is so located that it may be conveniently manipulated by the operator and swung either to the right or to the left to turn the stitcher arms upon their pivots.

It will now be noted particularly upon reference to Fig. 2 that the rack teeth of the two stitchers are so meshed with the rack teeth of the control lever that a movement of the lever to engage one of the stitchers with one side of the core will be automatically accompanied by the swinging of the other stitcher arm in a manner to swing the stitcher roll thereon into a spaced and hence inoperative relation to the core.

Referring now particularly to the diagrammatic illustration in Fig. 3, it will be seen that the stitcher 17 may be swung into engagement with the side of the tire and the driving connection between the motor and the core set to drive the core in the direction of the arrow. With this arrangement of the mechanism the stitcher may move circumferentially around the tire and regularly across the side thereof toward the center of the core without disturbing the lay of the cords, inasmuch as it will be following the lines of direction which the cords will naturally assume and in which they have initially been laid.

To stitch the cords on the opposite side, however, as in Fig. 4, which cords run in reversed direction with respect to the stitcher 18, it is necessary to reverse the direction of the drive of the motor and swing the stitcher 18 into engagement. The operation of the machine in this latter manner will insure proper stitching down of the other side of the fabric ply.

What I claim is:

1. A tire machine including a revoluble core, a driving mechanism for rotating the core, means whereby the direction of rotation of the core may be reversed at will, a pair of stitching elements for laying a ply of fabric down upon the core and means for controlling the position of the stitchers whereby either but not both of the stitchers may be operatively engaged with the core.

2. In a tire building machine, a revoluble core, a pair of carrying members mounted for swinging movement with respect to the core, fabric forming elements carried by the carrying members and adapted to be disposed through swinging of the members into engagement with the core, and a controlling means copulating the members in such a manner that the movement of one member to dispose its fabric forming element in operative position is automatically accompanied by a movement of the other member which disengages the fabric forming element thereof from the core, rendering said element inoperative with respect to the core.

3. A tire building machine including a revoluble core, a driving mechanism for rotating a core, means whereby the direction of rotation of the core may be reversed at will, a plurality of stitching elements operable for forming and shaping a ply of fabric upon the core, and means controlling the stitchers whereby they may be selectively engaged with the core but whereby they are positively prevented from being simultaneously engaged with the core and whereby the stitchers may further be simultaneously disposed in inactive position with respect to the core.

In testimony whereof I have signed my name in the presence of two subscribing witnesses.

JAMES D. THOMSON.

Witnesses:
B. J. McDanel,
R. S. Trogner.